United States Patent
McGivern

[11] Patent Number: 5,865,140
[45] Date of Patent: Feb. 2, 1999

[54] CAT RELIEF CHAMBER

[75] Inventor: Sean McGivern, Edwardsville, Ill.

[73] Assignee: Katbox King, Inc., Glen Carbon, Ill.

[21] Appl. No.: 965,343

[22] Filed: Nov. 6, 1997

[51] Int. Cl.⁶ .................................................. A01K 29/00
[52] U.S. Cl. ........................................................... 119/168
[58] Field of Search .................................... 119/165, 168, 119/482, 491, 496, 498

[56] References Cited

U.S. PATENT DOCUMENTS

| | | |
|---|---|---|
| 3,581,708 | 6/1971 | Beck . |
| 4,295,446 | 10/1981 | Voss . |
| 4,348,982 | 9/1982 | Selby . |
| 4,391,223 | 7/1983 | Holland et al. . |
| 4,520,758 | 6/1985 | Pfriender . |
| 4,603,658 | 8/1986 | Garnsey . |
| 4,807,563 | 2/1989 | Berry et al. . |
| 4,846,103 | 7/1989 | Brown . |
| 4,884,527 | 12/1989 | Skirvin . |
| 4,903,637 | 2/1990 | Devault . |
| 5,027,748 | 7/1991 | Wolak ........................ 119/168 |
| 5,046,457 | 9/1991 | Ashcroft et al. . |
| 5,465,686 | 11/1995 | Monetti et al. ............ 119/168 |
| 5,572,951 | 11/1996 | Evans et al. ............... 119/168 |

Primary Examiner—Thomas Price
Attorney, Agent, or Firm—Polster, Lieder, Woodruff & Lucchesi

[57] ABSTRACT

A cat relief chamber includes a front, a back, a floor, a first side, a second side, and a roof. The front has a doorway formed therein to allow for a cat to enter and exit the chamber. The chamber is adapted to be sold as a substantially flat preform and then expanded by a consumer to a formed state. The floor of the preform is assembled such that the floor forms as the consumer expands the preform to form the chamber. The doorway is formed from a door panel in the front of the chamber. The door panel is pushed in along perforations. The door extends upwardly from the bottom of the chamber, and when pushed in, becomes a part of the floor of the chamber. The chamber can be formed easily and quickly by the consumer and without the use of glue.

20 Claims, 3 Drawing Sheets

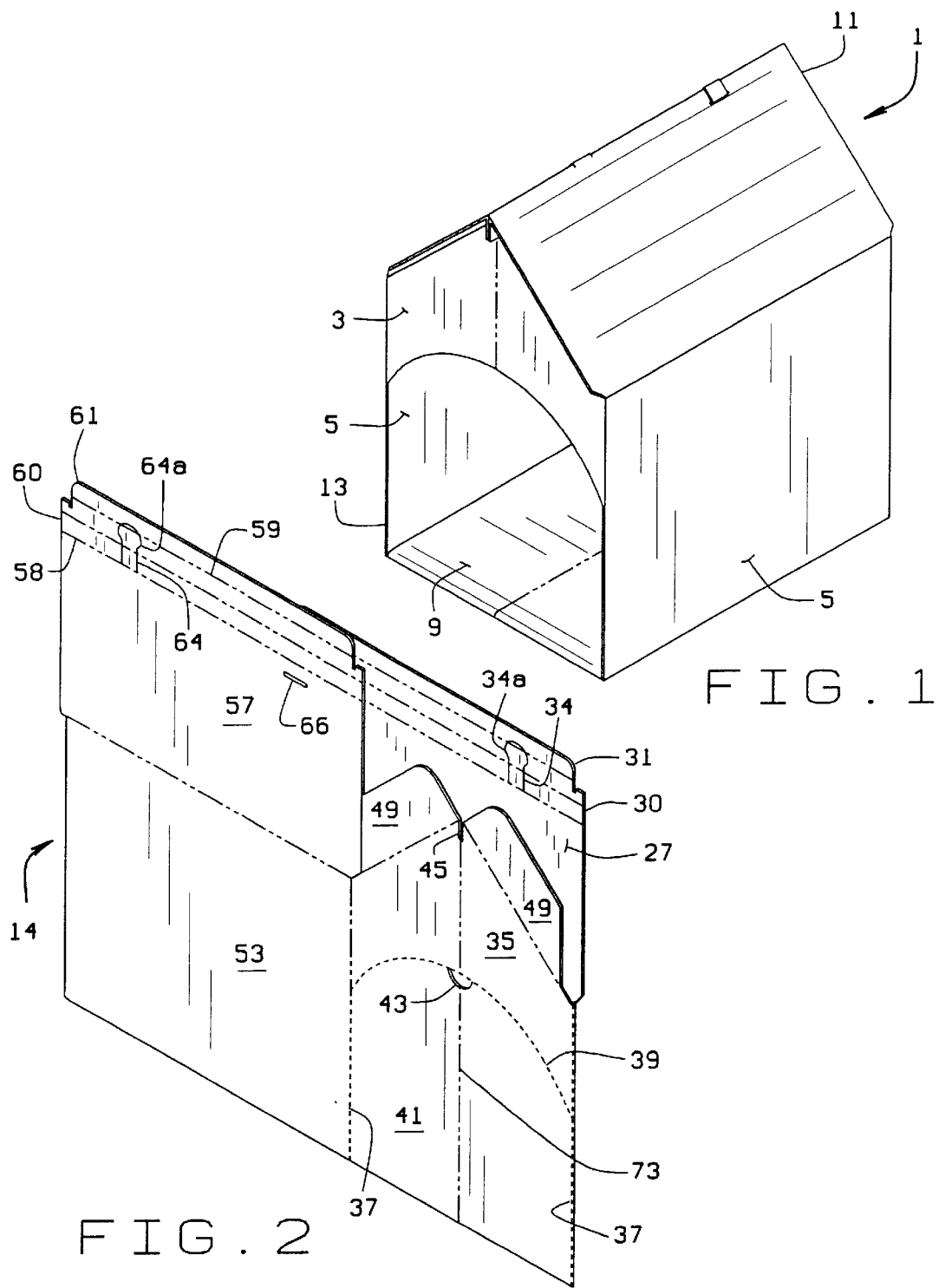

CAT RELIEF CHAMBER

BACKGROUND OF THE INVENTION

This invention relates to cat relief chambers which house kitty litter boxes, and, in particular, to a paperboard cat relief chamber.

Cat owners typically have kitty litter boxes in which their cats relieve themselves. The odors and unsightliness of kitty litter boxes is well known and many products have been introduced in an attempt to control the odor of kitty litter boxes. Many of these products are deodorizing agents for the kitty litter or reformulated kitty litter. However, various forms of cat relief chambers have also been introduced to control not only the odor, but also the unsightliness of kitty litter boxes. Cat relief chambers generally include a structure which houses a kitty litter box and which the cat enters to relieve itself. The cat relief structures serve to hide the kitty litter box and to retain whatever kitty litter may be kicked around by the cat. It will also maintain some of the odors of the kitty litter box. Many of the currently available cat relief chambers are expensive and/or are made from materials which are not easily recyclable. Therefore, the cat owners are reluctant to dispose of the cat relief chambers. Thus, the cat relief chambers must be cleaned periodically. Further, the cat relief chambers which are made from recyclable materials, such as paperboard, are difficult to assemble.

BRIEF SUMMARY OF THE INVENTION

A primary object of the present invention is to provide a cat relief chamber.

Another object is to provide a cat relief chamber which is made from paperboard and which is easily assembled by a consumer.

A further object is to provide such a cat relief chamber which is disposable.

These and other objects will become apparent to those skilled in the art upon reviewing the following description in light of the accompanying drawings.

Briefly stated, a cat relief chamber of the present invention includes a front, a back, a floor, a first side, a second side, and a roof. The front has a doorway formed therein to allow a cat to enter and exit the chamber. The chamber is adapted to be sold as a substantially flat preform and then expanded by a consumer to a formed state. The floor of the preform is assembled such that the floor forms as the consumer expands the preform to form the chamber. Thus, the consumer has very little to do to assemble the cat relief chamber. The chamber is thus an easily and quickly formed.

The chamber is formed from a one-piece blank which is preferably made of paperboard. The blank includes a front panel, a back panel, a first side panel, and a second side panel which correspond to the front, back, and sides of the chamber. The front, back, and side panels are hingedly connected in a linear manner. The blank further includes a front bottom panel hingedly connected to a bottom of the front panel, a back bottom panel hingedly connected to a bottom of the back panel, a first side bottom panel hingedly connected to a bottom of the first side panel, and a second side bottom panel hingedly connected to a bottom of the second side panel. The bottom panels are interrelated such that the front bottom panel overlies a portion of the first side bottom panel; the first side bottom panel overlies a portion of the back bottom panel; the back bottom panel overlies a portion of the second side bottom panel; and the second side bottom panel overlies a portion of the front bottom panel. The bottom panels are adhered (glued) together in such a manner that the chamber can be folded into the flat preform with the floor panels already glued together. To accomplish this, a first end of the front bottom panel is adhered to a central portion of the first side bottom panel and a first end of the back bottom panel is adhered to a central portion of the second side bottom panel. Fold lines are formed in the side bottom panels to allow the side bottom panels to fold at the first ends when the chamber is folded to a flattened state. The fold lines extend at an angle of 30°–60°, and preferably at an angle of about 45°, from the corner of the first ends of the side bottom panels adjacent the side panels. To further help folding, the front bottom panel and the back bottom panel are each generally trapezoidal in shape.

The front panel includes a line of weakness corresponding to the shape of the doorway to define a door panel. The door panel is hingedly connected to the front bottom panel at a bottom of the door panel, and the front bottom panel is hingedly connected to the front panel at the bottom thereof. The doorway thus extends upwardly from the bottom of the chamber. When the chamber is formed, the door panel is folded inwardly and is made a part of the floor.

Front and back panels, and hence the chamber front and back, are preferably peaked. The roof is made of a first roof panel hingedly connected to the first side panel at a top thereof and a second roof panel hingedly connected to the second side panel at a top thereof. The front and back panels each have an apex and a slot extending downwardly from the apex. The roof panels each have a connecting panel and a slot in the connecting panels which mates with the apex slot. The roof panel slot and the apex slot cooperate to connect the roof panels to the front and back panels, without the use of glue. To provide some support for the roof panels, the front and back panels each include roof support panels hingedly connected to them. The roof panels additionally have tabs sized to extend over a peak of the roof and which are received in slots on the opposite roof panel to further hold the roof panels in place. The roof panels rest on the roof support panels when the chamber is formed.

BRIEF DESCRIPTION OF THE SEVERAL VIEWS OF THE DRAWINGS

FIG. 1 is a front perspective view of a cat relief chamber of the present invention;

FIG. 2 is a view of the cat relief chamber in a flat state as manufactured;

Corresponding reference numerals will be used throughout the several figures of the drawings.

DETAILED DESCRIPTION OF THE INVENTION

Figure 3:
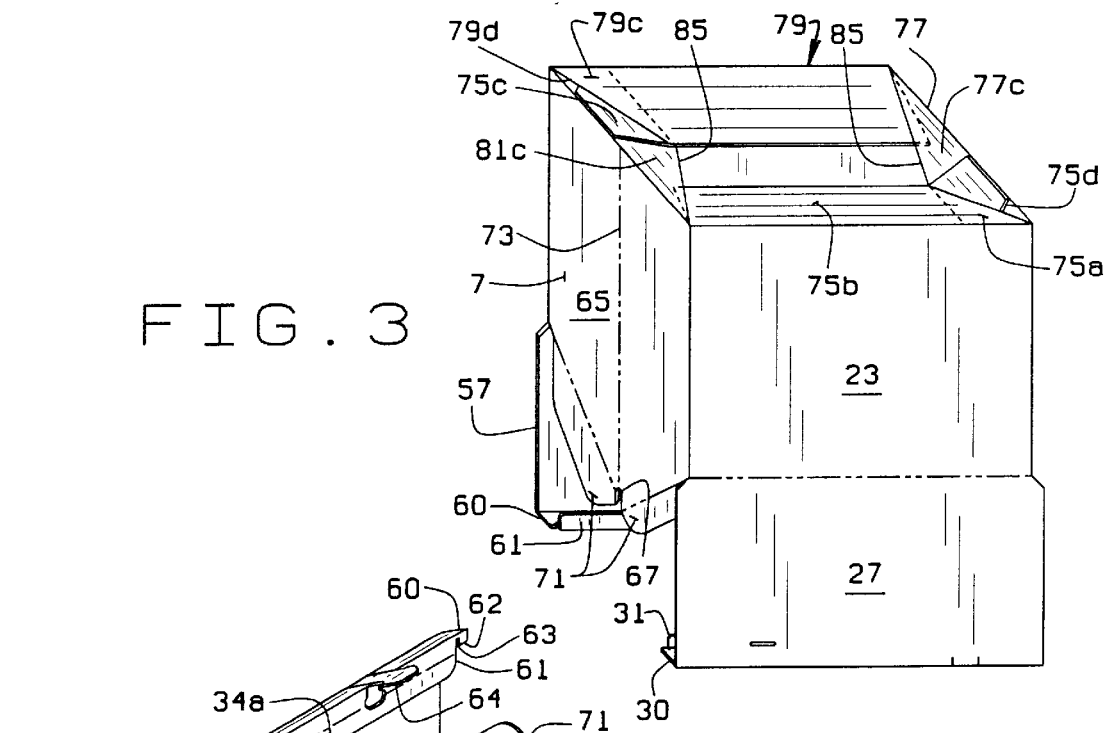
FIG. 3 is a bottom perspective view of the cat relief chamber during formation of the cat relief chamber showing how the floor of the chamber is formed when the chamber is unfolded.

The following detailed description illustrates the invention by way of example and not by way of limitation. This description will clearly enable one skilled in the art to make and use the invention, and including what I presently believe is the best mode of carrying out the invention.

Referring initially to FIG. 1, a cat relief chamber 1 of the present invention includes a front 3, sides 5, a back 7, a floor 9, and a roof 11. A doorway 13 is provided in the front 5 to allow a cat to enter the chamber 1. The chamber 1 is sized to accept a standard sized kitty litter tray or box, such as a kitty litter box manufactured in accordance with U.S. Pat. No. 5,251,573, which is incorporated herein by reference. The doorway 13 is sized to enable a cat to enter the chamber 1 when a kitty litter box is in place in the chamber. For example, the chamber can have the following dimensions: 13"×17½"×22". The doorway 13, which is the full side-to-side width of the chamber 1, can have a height of about 13". This size is sufficient for nearly all cats.

The chamber 1 is preferably made from a single paperboard blank 21 (FIG. 6) which is assembled as will be discussed below and made available to consumers in a flat folded state. The consumer simply expands the chamber from its folded state, and with a few bends or folds along preformed fold lines, easily and quickly forms a completed relief chamber, all without the use of glue.

Figure 6:
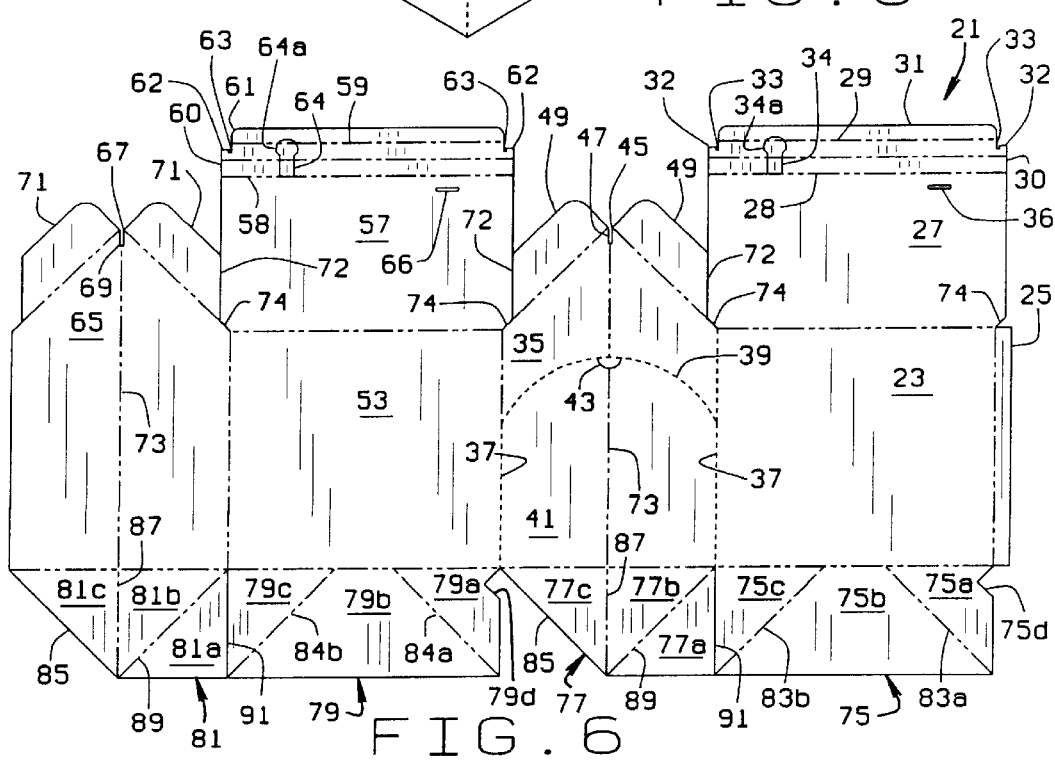
FIG. 6 is a plan view of the blank from which the cat relief chamber is formed.

Turning to FIG. 6, the blank 21 includes a series of panels which are hingedly connected to form the chamber. It will be understood that unless otherwise specified, the hinged connections between the various panels are all formed by fold lines. They can also be formed by appropriately placed slits, scores, or other lines of weakness which will facilitate folding of the carrier. Starting at the right in FIG. 6, the blank includes a first side panel 23 having a glue tab 25 hingedly connected along a vertical side of the panel. A first roof panel 27 is hingedly connected to the top of the panel 23. Two fold lines 28 and 29 extend horizontally across the top of the roof panel 27 to form folding sections 30 and 31. The top roof section 31 has sides which are set slightly inwardly from the sides of the section 30. Small tabs 32 extend upwardly from the roof section 30 spaced slightly from the ends of roof section 31. The tabs 32 and the roof section 31 form small vertical slits 33. The roof panel 27 also includes a locking tab 34 and a slot 36. The tab 34 has an enlarged head 34a. The locking tab 34 extends upwardly from the fold line 28, and the slot 36 is positioned beneath the fold line 28 and extends generally parallel to the fold line 28. The tab 34 and slot 36 are preferably set inwardly an equal distance from the sides of the roof panel 27.

A front panel 35 is hingedly connected to the side panel 23 along the side opposite the glue tab 25. The front panel 35 has two side perforations 37 which extend upwardly along a part of the side edges of the front panel 35. The side perforations are joined by an arced perforation 39. The perforations 37 and 39 define a door panel 41 which when knocked down, as will be explained below, forms the doorway 13 in the front 3 and a part of the floor 9. The door panel 41, and hence the doorway 13, extends the full width of the front panel 35 (and of the chamber front 3). A cut-out 43 is formed at the top of the door panel 41 to facilitate knocking down of the door panel. The front panel 35 is peaked and has an apex 45. A small slot 47 extends downwardly from the apex 45. Lastly, a pair of roof support panels 49 are hingedly connected along the sloped top edges of the front panel 41.

A second side panel 53 is hingedly connected to the left edge (with reference to FIG. 6) of the front panel 35. The second side panel 53 is identical to the first side panel 23.

A second roof panel 57 is hingedly connected to the top of the panel 53. Two fold lines 58 and 59 extend horizontally across the top of the roof panel 57 to form folding sections 60 and 61. The top roof section 61 has sides which are set slightly inwardly from the sides of the section 60. Small tabs 62 extend upwardly from the roof section 60 spaced slightly from the ends of roof section 61. The tabs 62 and the roof section 61 form small vertical slits 63. The roof panel 57 also includes a locking tab 64 and a slot 66. The tab 64 has an enlarged head 64a. The locking tab 64 extends upwardly from the fold line 58, and the slot 66 is positioned beneath the fold line 58 and extends generally parallel to the fold line 58. The tab 64 and slot 66 are preferably set inwardly an equal distance from the sides of the roof panel 27, such that the tab 64 is aligned with the slot 36 and the slot 66 is aligned with the tab 34. The tabs 34 and 64 are sized to extend over the peak of the roof 11 and to extend to, and be received in, their opposing slots 66 and 36, respectively.

A back panel 65 is hingedly connected to the side panel 53 along the side opposite the front panel 35. Like the front panel, the back panel 65 is peaked and has an apex 67. A small slot 69 extends downwardly from the apex 67. Lastly, a pair of roof support panels 71 are hingedly connected along the sloped top edges of the back panel 65.

Figure 5:
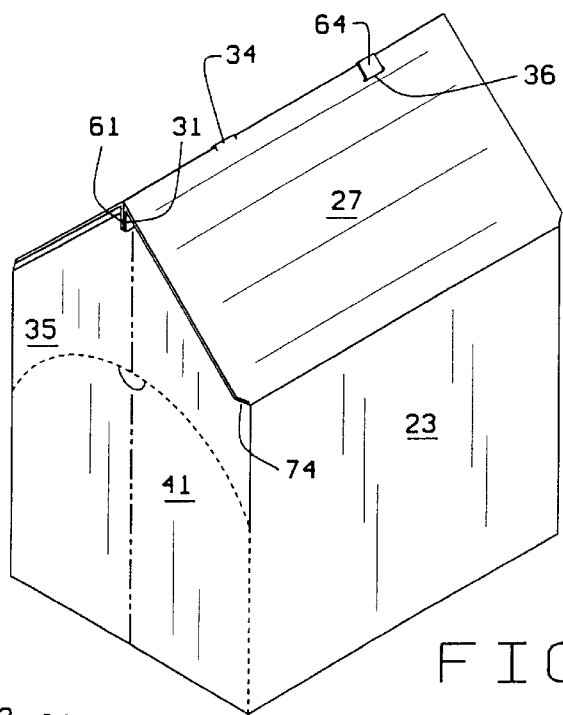
FIG. 5 is a perspective view of the cat relief chamber prior to forming the door way to the chamber.

The roof panels 27 and 57 are separated from the roof support panels 49 and 71 by slits 72. The roof panels have a side-to-side width (front to back length in the completed chamber) which is greater than the width of the side panels. The roof panels are beveled at their bottom corners 74. This slight extra length gives the roof a slight overhang, which can be seen in FIGS. 1 and 5. Lastly, the front and back panels 35 and 65, respectively each have a vertical fold line 73 which extends from their apexes 45 and 67, respectively to their bottoms.

The bottom 9 of the chamber 1 is formed of four panels, 75, 77, 79, and 81. The bottom panels 75 and 79 are identical and are hingedly connected to the bottom edges of the side panels 23 and 53. They include two diagonal fold lines 83a,b and 84a,b which extend upwardly and inwardly from the bottom corners of the panels 75 and 79 to divide the panels into three sections 75a–c and 79a–c. The sections 75a and 79a are right triangles. The center sections 75b and 79b are trapezoidal, and have top edges that are smaller than the bottom edges. That is, the edges of the sections 75b and 79b adjacent the side panels 23 and 53 are shorter than the edges at the bottom of the panels. In fact, the bottom edges of the center sections 75b and 79b extend the full length of the center sections. The front sections 75c and 79c are right triangles. Small triangular cut-outs 75d and 79d are formed at the edges of the panel sections 75c and 79c adjacent the fold line between panels side panels 23 and 53 and the bottom panels 75 and 79.

The bottom panels 77 and 81 are also identical to each other and are hingedly connected to the bottom edges of the front and back panels 35 and 65, respectively. The bottom panels 77 and 81 have one edge that form a 45° angle with the bottom edges of the panels. A fold line 87, which is a continuation of the fold lines 73 extend down the bottom panels 77 and 81 and end at the intersection of the bottom edge of the panel and the diagonal edge 85 of the panels. Another fold line 89 extends at a 45° angle from the bottom of the fold line 87 to the corner of the panels adjacent the bottom panels 75 and 79. The fold lines 87 and 89 divide the bottom panels 77 and 81 into three right triangular sections 77a–c and 81a–c. The bottom panels 77 and 81 are separated from the bottom panels 75 and 79 by slits 91.

To form the blank 21 into the flattened preform 14 of FIG. 2, the glue tab 25 is folded along its fold line and the blank is folded along the fold line between the front panel 35 and the side panel 53. The glue tab 25 is then glued to the back (or inner) side of the side panel 65. To ensure that the floor forms when the chamber is expanded, the bottom panel section 75c is glued to the bottom panel section 79b, such that the fold line 83b overlies the fold line 89 of panel 77. The bottom panel section 79c is glued to the bottom panel section 81b, such that the fold line 84b overlies the fold line 89 of panel 81. When the bottom panels 75–81 are glued together, panel section 75a overlies panel section 81c; panel section 81a overlies panel section 79c; panel section 79a overlies panel section 77c; and panel section 77a overlies panel section 75c.

When the preform 14 is formed from the blank 21, the inner surface of panel sections 75a,b and the outer surface of panel section 77a lie against the inner surface of the side panel 23. The panel 75 is folded about its fold line 83b and the panel section 75c is sandwiched between the outer surface of panel section 77b and panel section 75b. The inner surface of panel 77 lies against the inner surface of front panel 35. The inner surface of panel section 79a,b and the outer surface of panel section 81a lie against the side panel 53. The panel 79 is folded about its fold line 84b and the panel section 79c is sandwiched between the outer surface of panel section 81c and the outer surface of panel section 79b. Lastly, the inner surface of panel section 81 lies against the inner surface of panel 65. In the foregoing, "inner surface" refers to the surfaces that face upwardly or inwardly into the chamber 1 when the chamber 1 is formed. Conversely, "outer surfaces" refer to the surfaces which are external to, or face away from the chamber 1.

The chamber 1 can be supplied in the flattened state of the preform 14. However, to reduce the amount of space the chamber takes up, the front and back panels 35 and 65 are folded inwardly along their vertical fold lines 73. In this flattened state, the folded chamber is only as wide as the side panels. When the preform 14 is so folded, it is preferably shrink-wrapped or otherwise wrapped in cellophane or the like so that the folded chamber will remain in the flattened state.

Figure 4:
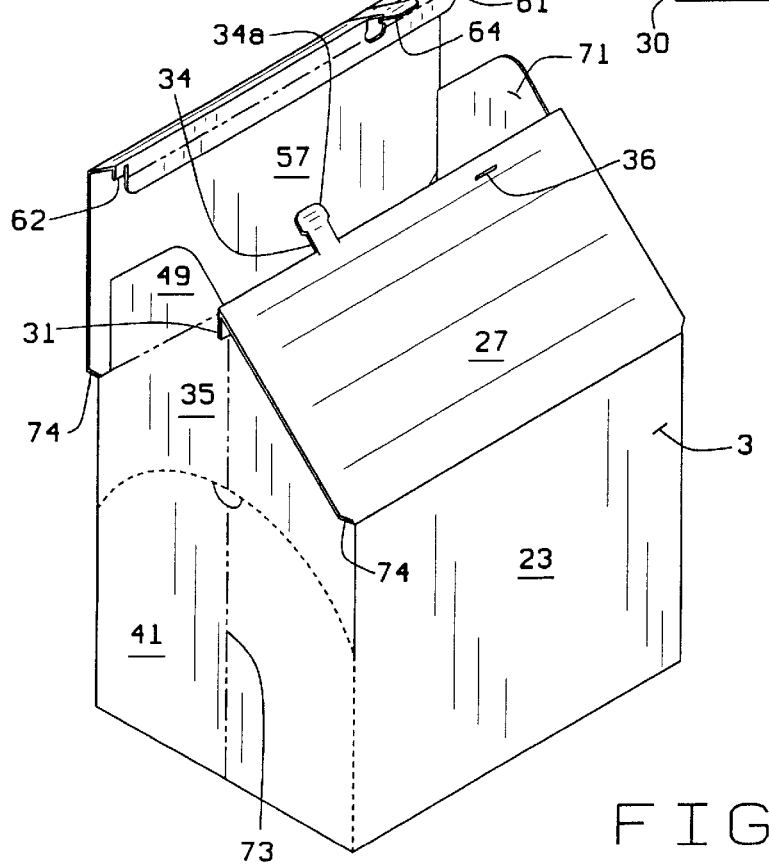
FIG. 4 is a perspective view of the cat relief chamber with the roof of the chamber partly formed.

The preform 14 is transformed into the chamber 1 simply by pivoting the preform 14 about the junction between the side panels 23 and 53 and the front and back panels 35 and 65 to square the chamber. If the front and back panels are folded inwardly along their fold lines 73, the chamber will automatically expand once the chamber is unwrapped. As the chamber is expanded, the bottom panels 75–81 will pivot about their fold lines with their respective wall panels to begin to form the floor 9. As noted above, when the floor is formed panel section 75a overlies panel section 81c; panel section 81a overlies panel section 79c; panel section 79a overlies panel section 77c; and panel section 77a overlies panel section 75c. When the preform is fully squared, the floor will be flat and the now partially formed chamber can be placed on a surface. In this state, the roof panels 27 and 57 will extend upwardly from the side panels 23 and 53, respectively. Similarly, the roof support panels 49 and 71 will extend upwardly from the front and back panels 35 and 65, respectively. Next, the roof support panels 49 and 71 are folded along their hinged connections with the front and back panels 35 and 65, respectively, such that they extend inwardly at about an angle of 90° with the front and back panels. The roof panels 27 and 57 are then folded along their fold lines 28,29 and 58,59 such that the roof panel sections 30,31 and 60,61 angle inwardly to the chamber, such as is shown with panel 57 in FIG. 4. The roof panels are then folded or bent along their hinged connection with their respective side panels until the roof panels overlie the roof support panels. In this state, the slots 33 and 63 of the roof panels are received in the slots 45 and 69 of the front and back panels, respectively. This interaction between the roof panels and the front and back panels will hold the roof panels in place without the need for glue. However, if desired, the roof panels could be glued to the roof support panels by the consumer. The roof tabs 34 and 64 are bent over the peak of the roof 11 and their respective heads 34a and 64a are inserted into the opposing slots 66 and 36, respectively. The tab heads 34a and 64a are sized such that they need to be forced into the slot, so that they cannot withdraw from the slot on their own. When the roof 11 is assembled in place, the chamber will appear as in FIG. 5. The last step is to fold in the front panel section 41, by pushing it inwardly. The panel section 41 is hingedly connected to the bottom panel 77, and thus, when the door panel 41 is pushed inwardly, it forms a part of the floor 9 in addition to the doorway 13 of the chamber 1. The chamber will then be completed, and appear as shown in FIG. 1.

Once the chamber 1 has been assembled by the consumer, the consumer can place a kitty litter box or tray in the chamber 1. As can be appreciated, because the door panel 41 lies over the bottom panels 75–81, it will cover the connections between the panels. Thus, when a cat kicks the kitty litter, if the kitty litter is kicked out of the tray, the litter will not fall inbetween the bottom panels or fall through the floor of the chamber 1. Preferably, the chamber is dimensioned such that its width and length are substantially equal to the width and length of a kitty litter tray or box. Because the doorway 13 is equal to the side-to-side width of the chamber 1, the litter tray or box can be easily slid into the chamber 1. Thus, the sides of the litter box will be against the walls of the chamber, and litter will not readily get between the chamber walls and the litter box. However, any litter that may pass to the floor of the chamber will be substantially prevented from getting between the layers of the floor 9 by the door panel 49.

Because the chamber 1 is made from paperboard, it can be made available to the consumer fairly inexpensively. As can be seen from the foregoing description, the chamber is easily formed by the consumer from a flattened state to the fully assembled chamber of FIG. 1. Because it is fairly inexpensive, the chamber can be disposed of when it becomes dirty and replaced with a new one. Further, the used and discarded chamber can be recycled along with other paperboard products.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense. For example, the fold lines 83a, 84a and 89 in the bottom panels can be eliminated. Similarly, the fold lines 73 in the front and back panels 35 and 65 can be eliminated if the chamber is to be supplied to consumers as the preform 14 shown in FIG. 2. The size of the chamber can be altered as desired. The roof can be flat rather than sloped. These examples are merely illustrative.

I claim:

1. A cat relief chamber comprising a front, a back, a floor, a first side, a second side, and a roof; the front having a doorway formed therein to allow for a cat to enter and exit the chamber; the cat relief chamber erected from a substantially flat preform, the preform being formed from a blank, the preform including a front panel, a back panel, a first side panel, and a second side panel; said panels corresponding to the front, back, and sides of the chamber; said front, back, and side panels being hingedly connected in a linear manner; said blank further including a front bottom panel hingedly connected to a bottom of the front panel, a back bottom panel hingedly connected to a bottom of the back panel, a first side bottom panel hingedly connected to a bottom of the first side panel, and a second side bottom panel hingedly connected to a bottom of the second side panel; a first end of said first side bottom panel overlying a first end of said back bottom panel; a second end of said back bottom panel overlying a first end of said second side panel; a second end of said second side panel overlying a first end of said front bottom panel; and a second end of said front bottom panel overlying a second end of said first side bottom panel; whereby the floor of the chamber is formed as the cat relief chamber is expanded by a consumer from a substantially flat state to an erect state.

2. The cat relief chamber of claim 1 wherein the blank is a one-piece blank.

3. The cat relief chamber of claim 2 wherein the blank is made of paperboard.

4. The chamber of claim 1 wherein said front bottom panel is adhered to said first side bottom panel and said back bottom panel is adhered to said second side bottom panel.

5. The chamber of claim 1 wherein said front bottom panel and said back bottom panel are each generally trapezoidal in shape.

6. The chamber of claim 1 wherein said front panel includes a line of weakness corresponding to the shape of said doorway to define a door panel; said door panel being hingedly connected to said front bottom panel at a bottom of said door panel; said floor of said chamber including said door panel.

7. The chamber of claim 1 wherein the front and back panels, and hence said chamber front and back, are peaked; said roof comprising a first roof panel hingedly connected to said first side panel at a top thereof and a second roof panel hingedly connected to said second side panel at a top thereof.

8. The chamber of claim 7 wherein at least one of said front and back each have an apex, at least one of said front and back having a slot extending downwardly from said apex; said roof panels each having a connecting panel; said connecting panel having a slot which mates with the apex slot, said roof panel slot and said apex slot cooperating to connect the roof panels to the front and/or back panels.

9. The chamber of claim 8 wherein said front and back panels each include roof support panels hingedly connected to said front and side panels, said roof panels resting on said roof support panels when said chamber is formed.

10. The chamber of claim 8 wherein said roof panels include at least one opposing tab and slot, said tab being sized to extend over said roof apex to be received in said slot.

11. The chamber of claim 10 wherein said tab has a head sized to be frictionally received through said slot.

12. The chamber of claim 10 wherein each roof panel has a tab and a slot; the tabs of the individual roof panels being received in the slots of the opposing roof panel.

13. The cat relief chamber of claim 1 wherein, when the preform for the cat relief chamber is in its substantially flat state, an inner surface said first end of said first side bottom panel and an outer surface of said second end of said front bottom panel lie against an inner surface of the first side panel;

the first side bottom panel is folded about its folded such that the second end of said first side bottom panel is sandwiched between the outer surface of front bottom panel and first side bottom panel;

the inner surface of the front bottom panel lies against the inner surface of front panel;

the inner surface of the second end of the second side bottom panel and the outer surface of the second end of the back bottom panel lie against the second side panel;

the second side bottom panel folded such that the first end of the second side bottom panel is sandwiched between the outer surface of first end of the back bottom panel and the outer surface of the second side bottom panel; and the inner surface of the back bottom panel lies against the inner surface of the back panel.

14. The cat relief chamber of claim 13 wherein the bottom panels are adhered to each other.

15. A cat relief chamber formed from a one-piece blank, said chamber having a front panel, a back panel, a first side panel, a second side panel, a roof, and a floor; said floor comprising a front floor panel, a back floor panel, a first side floor panel, and a second side floor panel; said front panel including a door panel defined by a line of weakness; said front floor panel being hingedly connected to said front panel, and said door panel being hingedly connected to said front floor panel; said door panel overlying said front floor panel, back floor panel, and side floor panels when said cat relief chamber is formed.

16. The cat relief chamber of claim 15 wherein said front floor panel, back floor panel, and side floor panel are connected such that said chamber is foldable to a flat state in which said floor panels remain connected.

17. The cat relief chamber of claim 16 wherein said first side floor panel has a first end adhered to an intermediate portion of said front floor panel and said second side floor panel has a first end adhered to an intermediate portion of said back floor panel.

18. The cat relief chamber of claim 17 wherein said first and second side floor panels each include a fold line at the first ends of said side floor panels, said fold lines extending from a corner of said first end of side floor panels adjacent their respective side panels inwardly to an edge of said side floor panels opposite the side panels.

19. The cat relief chamber of claim 18 wherein said fold lines in said side floor panels extend at an angle of between about 30° and about 65° from said corner.

20. The cat relief chamber of claim 19 wherein said fold lines extend at an angle of about 45°.

* * * * *